United States Patent [19]

Fujie et al.

[11] Patent Number: 5,037,189
[45] Date of Patent: Aug. 6, 1991

[54] CLEANING APPARATUS FOR A MIRROR

[75] Inventors: Naofumi Fujie; Yasuo Kuwabara; Shoji Okada, all of Aichi, Japan

[73] Assignee: Aisin Seiki Kabushiki Kaisha, Kariya City, Japan

[21] Appl. No.: 315,741

[22] Filed: Feb. 27, 1989

[30] Foreign Application Priority Data

Feb. 25, 1988 [JP] Japan .................. 63-043008

[51] Int. Cl.$^5$ .................................. G02B 5/10
[52] U.S. Cl. .................................. 359/507
[58] Field of Search ............... 350/582, 584, 610, 320, 350/606, 588, 600-610, 582-584, 588-590; 250/340; 374/119, 20; 165/170; 340/904, 435, 539; 65/27; 73/570-577, 662-667, 507-510; 219/202-206, 219; 331/154; 15/250 B

[56] References Cited

U.S. PATENT DOCUMENTS

| 3,453,049 | 7/1969 | Wager, Jr. | 350/584 |
| 4,277,672 | 7/1981 | Jones | 219/219 |
| 4,445,063 | 4/1984 | Smith | 331/154 |
| 4,550,988 | 11/1985 | Harder et al. | 350/584 |
| 4,833,373 | 5/1989 | Doi et al. | 350/582 |
| 4,864,100 | 9/1989 | Cicak | 219/202 |
| 4,929,072 | 5/1990 | Fujie et al. | 350/582 |

FOREIGN PATENT DOCUMENTS

| 190561 | 7/1989 | Japan | 15/250 B |
| 306347 | 12/1989 | Japan | 15/250 B |

Primary Examiner—Bruce Y. Arnold
Assistant Examiner—Thong Nguyen
Attorney, Agent, or Firm—Sughrue, Mion, Zinn, Macpeak & Seas

[57] ABSTRACT

Ultrasonic vibrators, attached to the back of a mirror, are vibrated according to an A.C. signal pattern which is selected from various A.C. signal patterns for the removal of water, frost and/or ice from the surface of the mirror. Further included is a temperature detecting device attached to the back of the mirror for inhibiting operation of the ultrasonic vibrators when the temperature of the mirror exceeds a predetermined temperature, to thus avoid thermally-induced damage to the mirror.

5 Claims, 4 Drawing Sheets

CLEANING APPARATUS FOR A MIRROR

BACKGROUND OF THE INVENTION

This invention relates to a cleaning apparatus for a mirror which removes water drops, frost and ices on the mirror. This invention, for example, can be used in the environment of automobile back mirrors.

Japanese Utility-Model Laid-Open Patent Publication No. 61-30552 published on Feb. 24, 1986, discloses a conventional cleaning apparatus for a mirror. Referring to FIG. 6, the conventional apparatus is explained. A back mirror (32) is externally fixed to an automobile body. The back mirror (32) comprises a glass mirror (31), a stay (33) for supporting the glass mirror (31), an ultrasonic vibrator (34), an oscillating circuit (36), and a power switch (35) and a power supplier (37).

The power switch (35) is positioned in a compartment of the automobile. When the power switch (35) is turned on, the oscillating circuit (36) starts supplying an oscillating, signal and, the mirror (31) is vibrated by the ultrasonic vibrator (34). The ultrasonic vibration on the mirror (31) serves to remove water drops.

On the other hand, Japanese Laid-Open Patent No. 60-193739 published on Oct. 2, 1985, discloses another other conventional apparatus which removes water drops from the mirror by use of a Joule's heater. Such conventional apparatus comprises a metal film for reflecting light and a pair of electrodes allowing flow of an electric current through the film.

When the electric current flows through the film, the film generates a Joule's heat and this heat is conducted to the mirror. When the mirror is heated, the water drops are removed by evaporation.

However, the conventional apparatus with an ultrasonic vibrator cannot effectively remove frost and ice from the mirror because only a local position near the vibrator is heated, while a circumference part of the mirror is not heated.

Further, the conventional apparatus with a Joule's heater can hardly remove the water drops quickly as possible because the water drops are hard to heat rapidly by the conduction.

SUMMARY OF THE INVENTION

Accordingly, one object of the invention is to obviate the conventional drawbacks.

It is also an object of the invention to melt the frost and ice on a whole of a mirror using an ultrasonic vibrator.

Further, it is an object of the invention to remove water drops, frost and ice on a mirror as quickly as possible.

To achieve the above objects, and function in accordance with the principles of the invention as embodied and broadly described herein, there is provided cleaning apparatus for cleaning a mirror and which comprises: ultrasonic vibrating means for vibrating the mirror; oscillating means for generating an A.C. signal and for supplying the A.C. signal to the ultrasonic vibrating means; switching means for selecting patterns; and controlling means for turning on and off the oscillating means based on the selected pattern.

A second cleaning apparatus embodiment comprises: ultrasonic vibrating means for vibrating the mirror; oscillating means for generating the A.C. signal and for supplying the A.C. signal to the ultrasonic vibrating means; controlling means for turning on and off the oscillating means based on a predetermined pattern; temperature detecting means for detecting a temperature of the mirror; and inhibiting means for inhibiting an oscillation of the oscillating means when the temperature of the mirror exceeds a predetermined temperature.

BRIEF DESCRIPTION OF THE DRAWINGS

The accompanying drawings, which are incorporated in and constitute a part of the specification, illustrate an embodiment of the invention, and, together with the description, serve to explain the principles of the invention. In the drawings.

DETAILED DESCRIPTION OF THE PREFERRED EMBODIMENT

Reference will now be made in detail to the present preferred embodiment of the invention, an example of which is illustrated in the accompanying drawings.

Figure 2:
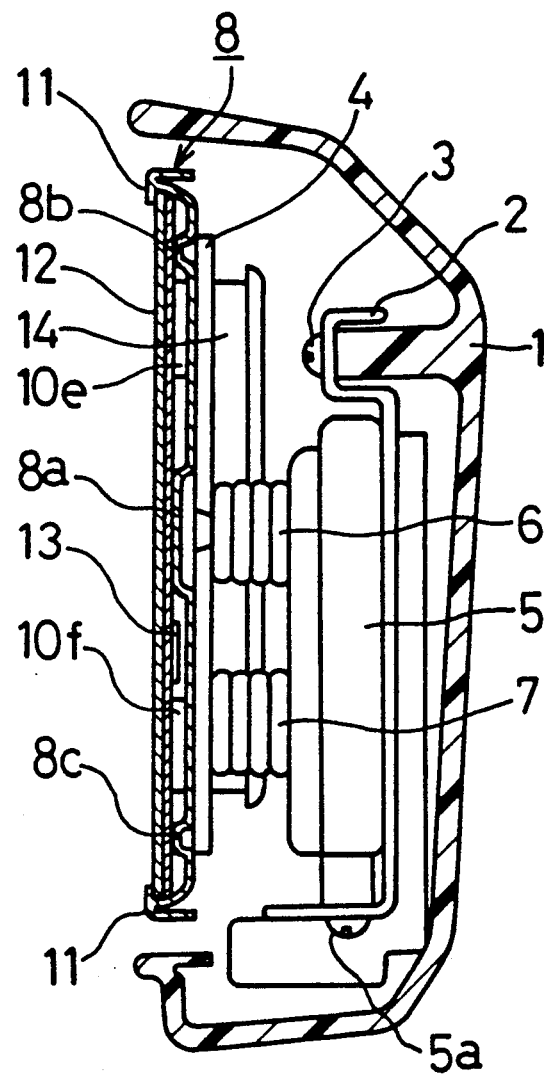
FIG. 2 is a cross sectional view of an automobile back mirror including the present invention.
Figure 3:
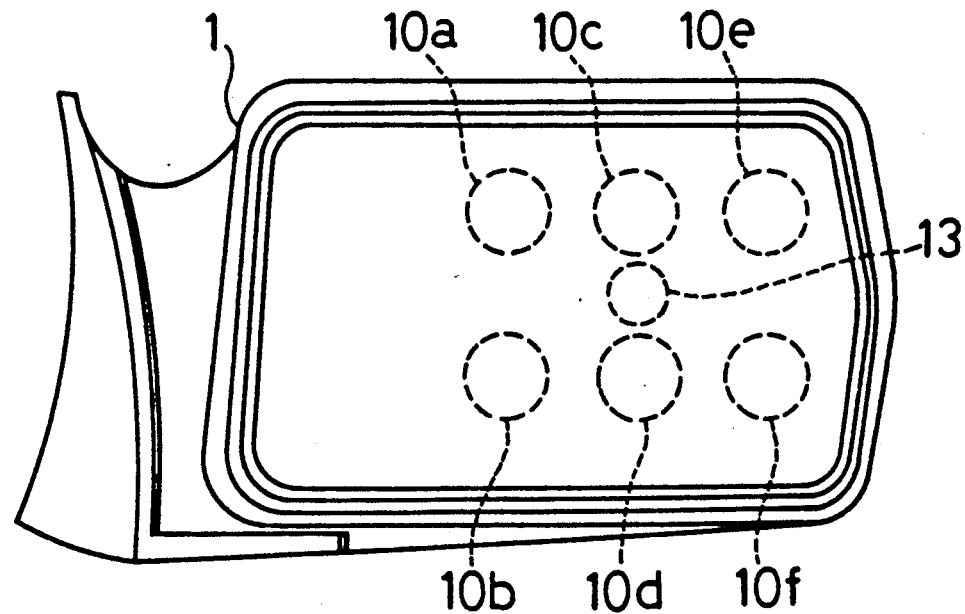
FIG. 3 is a front view of an automobile back mirror including the present invention.

Referring now to FIGS. 2 and 3, a vehicle door mirror including the present invention is explained. A mirror case (1) is fixed to a vehicle body. In the mirror case (1), a metal frame (2) is fixed to the case (1) by the screw (3). A mirror base (4) is pivotally mounted by a ball joint (not shown) in order to change a direction of a mirror (12). The mirror base (4) is made of synthetic resin. A mirror driving unit (5) is fixed to the metal frame (2) by screws (5a). The mirror driving unit (5) includes two output rods (not shown) which are capable of driving or displacing an angle of the major planar surface of the mirror (12) independently toward different directions. One end of each rod is connected to a different place on the mirror base (4) with respect to the other rod. The mirror base (4) is inclined toward an up and down direction or left and right direction when the output rods are driven by the mirror driving unit (5). Each rod of the mirror driving unit (5) is covered by one of the rubber bellows (6, 7). One end of each bellows (6, 7) is adhered to the mirror driving unit (5), and the other end of each bellows (6, 7) is adhered to the mirror base (4).

A mirror frame (8) is adhered to the mirror base (4). The, mirror frame (8) is made of a synthetic resin, and includes a loop flange (11). The loop flange (11) supports or confronts the outer circumference of the mirror (12) in order to fix the mirror (12) to the mirror frame (8). The mirror frame (8) includes a plurality of projections (8a, 8b, 8c) which are used in order to contact the mirror (12) with the mirror frame (8) partly. Accordingly, the mirror (12) is pinched between the loop flange (11) and the projections (8a, 8b, 8c).

As shown in FIG. 3, six ultrasonic vibrators (10a, 10b, 10c, 10d, 10e, 10f) are pinched between the mirror frame (8) and the mirror (12). In this embodiment, the vibrators (10a, 10b, 10c, 10d, 10e, 10f) are positioned in order to constitute a 2×3 matrix. In this embodiment, these ultrasonic vibrators (10a, 10b, 10c, 10d, 10e, 10f) are piezoelectric elements. Further, a thermister (13) is adhered to the mirror (12) in order to detect a temperature of the mirror (12).

A control device (14) is fixed to the mirror base (4). The control device (14) is positioned between mirror base (4) and the mirror case (1).

Figure 1:
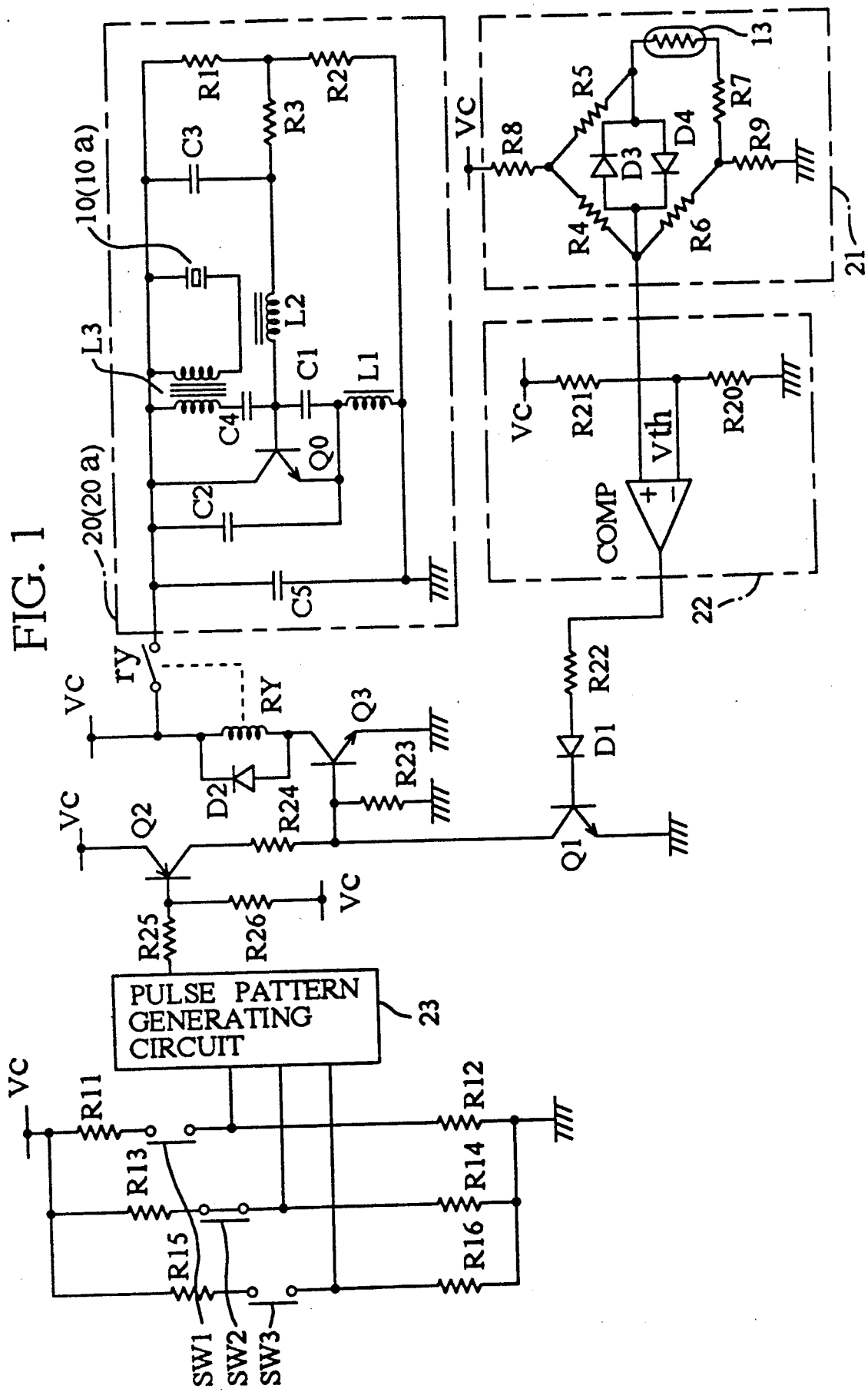
FIG. 1 is a circuit diagram of the present invention.

Referring now to FIG. 1, a circuit diagram of the control device (14) is explained. As the present invention is meant for implementation in vehicles (e.g., automobiles) the voltage source Vc illustrated throughout FIG. 1 can be provided by the vehicles battery or electrical generating system.

Each ultrasonic vibrator (10a, 10b, 10c, 10d, 10e, 20f) is driven by a separate oscillator circuit (20a, 20b, 20c, 20d, 20e, 20f). However, only the oscillator circuit (20a) is shown in FIG. 1 because remaining oscillator circuits (20b, 20c 20d, 20e, 20f) are each constructed of the same circuit. Each oscillator circuit (20) is a colpitts oscillating circuit that is well known in the art. Each oscillator circuit (20) generates the A.C. signal with a determined frequency ($f_0$). The frequency ($f_0$) is determined to be 1.7 (MHz) by following the formula in this embodiment.

$$f_0 = \frac{1}{2\pi \sqrt{L * (C_1 * C_2/(C_1 + C_2))}}$$

This oscillator circuit (20) comprises a transistor ($Q_0$), resisters ($R_1$, $R_2$, $R_3$), condensers ($C_1$, $C_2$, $C_3$, $C_4$, $C_5$) and coils ($L_1$, $L_2$, $L_3$). The condenser ($C_5$) is utilized for a regulation of supplied D.C. voltage.

The control device (14) further includes a temperature detecting circuit (21). The detecting circuit (21) includes resistors ($R_4$, $R_5$, $R_6$, $R_7$, $R_8$, $R_9$), clipping diodes ($D_3$, $D_4$) and thermister (13). The resistors ($R_4$, $R_5$, $R_6$, $R_7$) constitute a resistor bridge circuit. The thermister (13) is inserted in the bridge circuit. The detecting circuit (21) generates a voltage level corresponding to the detected temperature.

The voltage level from the detecting circuit (21) is applied to a comparing circuit (22). The comparing circuit (22) comprises a resistors ($R_{20}$, $R_{21}$) and comparator (COMP). A predetermined reference voltage (Vth) corresponding to 60(°C) is generated by a voltage divider comprising a voltage source and resistors ($R_{20}$, $R_{21}$). The comparator (COMP) generates a 'HIGH LEVEL' signal when the voltage level from the detecting circuit (21) exceeds a generates a 'LOW LEVEL' signal when the voltage level from the detecting circuit (21) is below the reference level (Vth).

Accordingly, the comparator (COMP) turns on a transistor ($Q_1$) though a resistor ($R_{22}$) and a diode ($D_1$) when the detected temperature exceeds 60(°C). While the transistor ($Q_1$) is turned on, a transistor ($Q_3$) and a relay (RY) is turned off. Accordingly, every oscillator (20) stops oscillating because no electric power is being supplied thereto (20).

Transistor ($Q_3$) is turned on and off by a pulse pattern generating circuit (23) through the transistor ($Q_2$) while the transistor ($Q_1$) is turned off.

The pulse pattern generating circuit (23) comprises a clock pulse generator, a frequency divider for dividing a frequency of the generated clock pulse, binary counters for counting the divided clock pulse and other logic circuits. In this embodiment, the pulse pattern generating circuit (23) generates three types of pulse patterns.

Figure 4A:
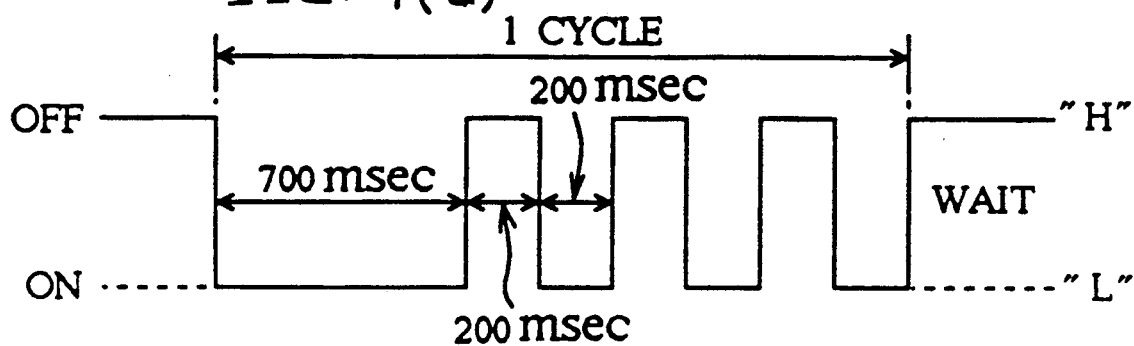
FIG. 4(a), FIG. 4(b) and FIG. 4(c) are timing charts showing three pulse patterns conjunction with the present invention.
Figure 4B:
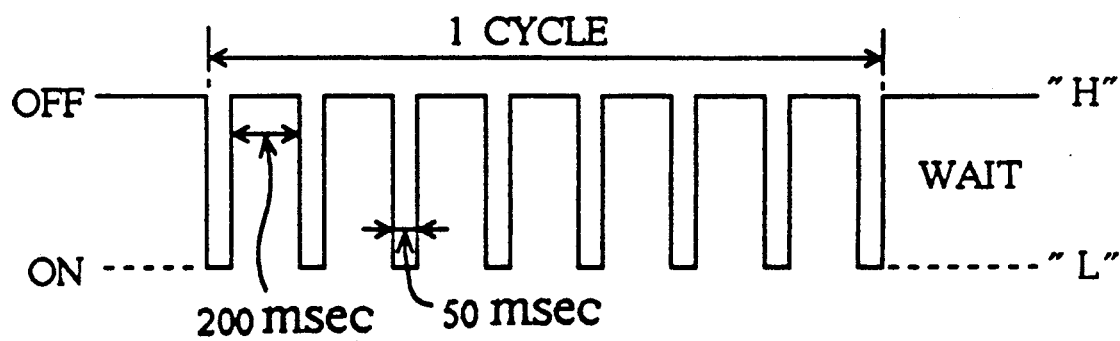
Figure 4C:
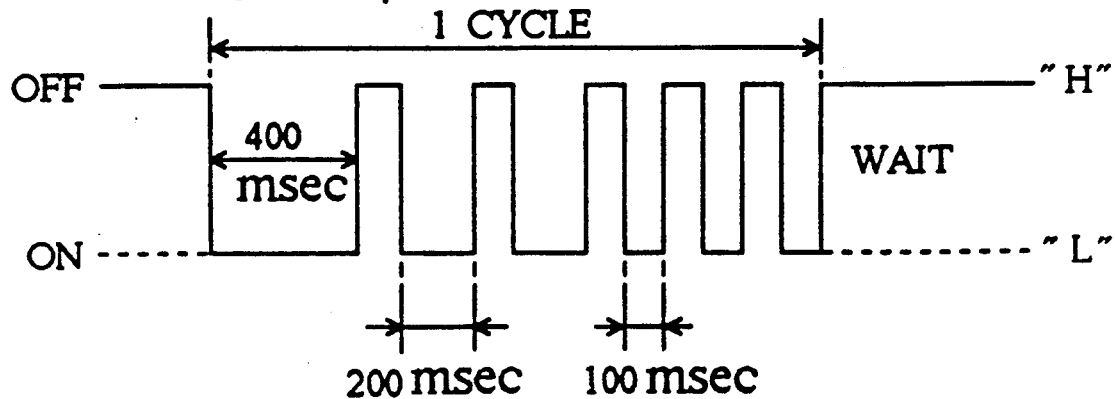

FIGS. 4(a), 4(b) and 4(c) show one cycle of these pulse patterns.

FIG. 4(a) shows a pulse pattern for mainly removing water drops on the mirror (12). The pulse pattern in FIG. 4(a) includes one 'LOW LEVEL' signal within a duration of 700(msec), and three 'HIGH LEVEL' signals each within a duration of 200(msec) and alternating with three 'LOW LEVEL' signals each within a duration of 200(msec) in one cycle.

One cycle of the pulse pattern in FIG. 4(a) is generated by the pulse pattern generating circuit (23) when a switch ($SW_1$) is turned on. While the first 'LOW LEVEL' signal within the duration of 700(msec) is generated, the transistor ($Q_2$) and relay (RY) are turned on. At this moment, the oscillator (20) start oscillating, and the mirror (12) is vibrated by the vibrators (10a, 10b, 10c, 10d, 10e, 10f). While the mirror (12) is vibrated, the water drops are removed rapidly since the water drops on the mirror (12) is splashed or dripped as a result of the vibrations.

Normally, the water drops are removed from the mirror (12) almost perfectly after the mirror (12) is vibrated within the duration of 700(msec). However, in the preferred embodiment; the mirror (12) is further vibrated within 200(msec) cyclically at three times with durations each of 200(msec) interval in order to remove the water drops from the mirror (12) more certainly.

While the mirror (12) is vibrated, the temperature of the mirror (12) rises, and the temperature is detected by the detecting circuit (21). When the temperature of the mirror (12) exceeds 60(°C), the transistor ($Q_1$) is turned on. Then the relay (RY) is turned off and no electric power is supplied to the ultrasonic vibrators (10a, 10b, 10c, 10d, 10e, 10f). As a result, the temperature of the mirror (12) as a result of vibration is never caused to exceed 60(°C).

By the way, according to the pulse pattern in FIG. 4(a), only local positions near the ultrasonic vibrators (10a, 10b, 10c, 10d, 10e, 10f) are heated, the vibrators (10a, 10b, 10c, 10d, 10e, 10f) generate the heat so rapidly that each oscillator (20) stops oscillating before conducting the heat to the mirror (12). As a result, the circumferential part of the mirror (12) does not heated sufficiently.

FIG. 4(b) shows a pulse pattern for removing the water drops, frost and ice from the mirror (12). The pulse pattern in FIG. 4(b) includes eight 'LOW LEVEL' signals within durations of 50(msec) and seven 'HIGH LEVEL' signals within duration of 200(msec).

One cycle of the pulse pattern in FIG. 4(b) is generated by the pulse pattern generating circuit (23) when a switch ($SW_3$) is turned on. While the 'LOW LEVEL' signals within duration of 50(msec) are generated, the transistor ($Q_2$) and relay (RY) are turned on. At this moment, the oscillator (20) starts oscillating, and the mirror (12) is vibrated by the vibrators (10a, 10b, 10c, 10d, 10e, 10f).

Further, while the mirror (12) is vibrated, the mirror (12) is heated. According to the pulse pattern in FIG. 4(b), the vibrators (10a, 10b, 10c, 10d, 10e, 10f) are to generate the heat gradually, and hence the duration of each 'LOW LEVEL' signal is shortened. Therefore, each oscillator (20) continues the oscillation until the heat generated by the vibrators (10a, 10b, 10c, 10d, 10e, 10f) is conducted to the mirror (12) sufficiently. As a result, an entire major planar surface of the mirror (12) is heated on the whole.

Figure 5:
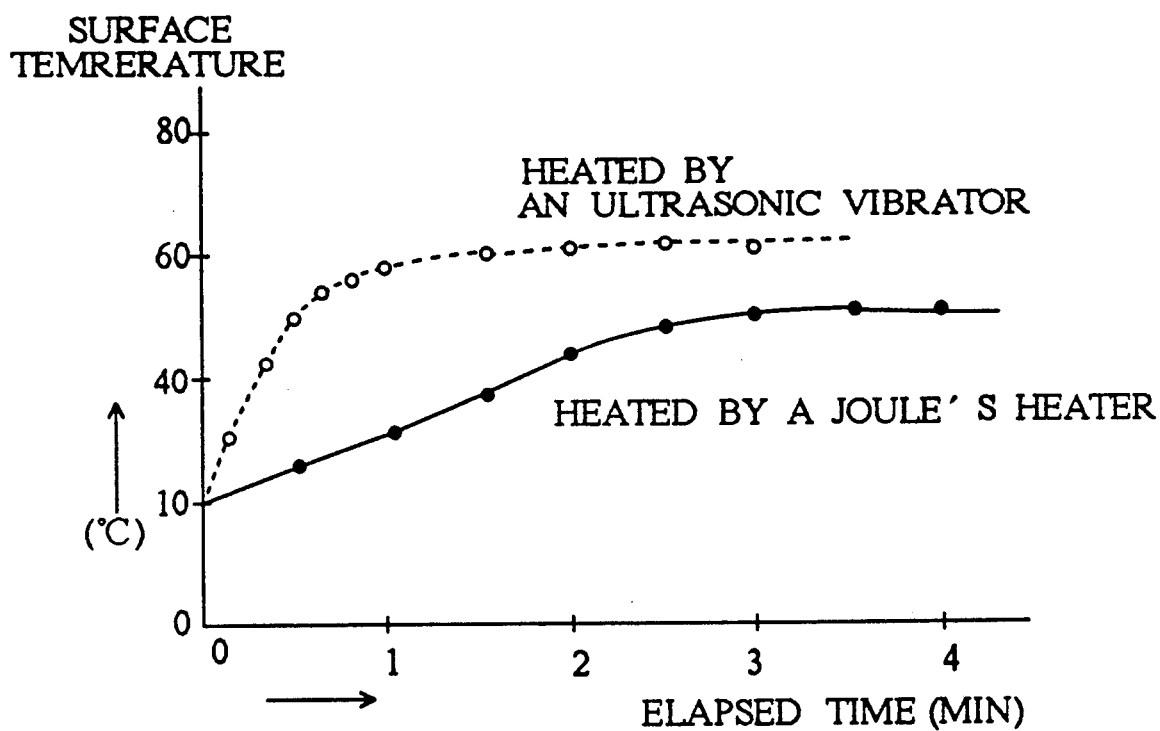
FIG. 5 is a graph showing a temperature characteristic of the present invention in comparison to a conventional Joule's heater.
Figure 6:
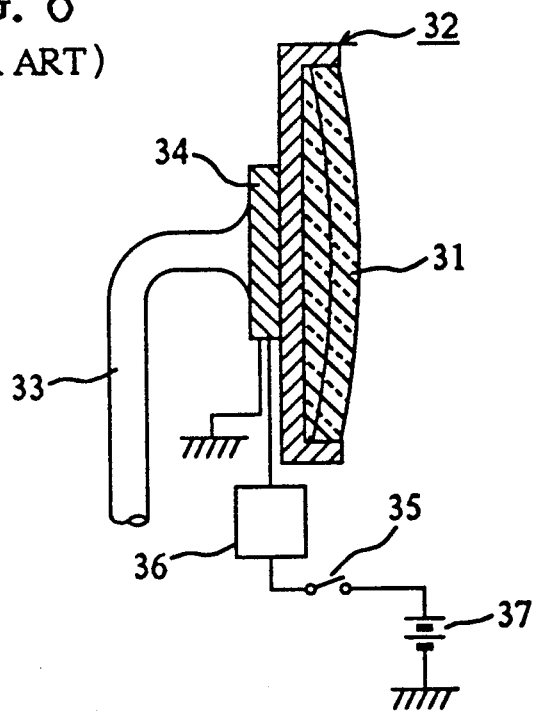
FIG. 6 is a cross sectional view of a conventional apparatus.

FIG. 5 shows temperature characteristics on the mirror (12) in comparison to temperature characteristics with Joule's heater. The temperature on the mirror (12) reaches about 40(°C) to 60(°C). Accordingly, frost and ice are melted by the heated mirror (12) and become water drops naturally. While the mirror (12) is vibrated, the water drops are removed rapidly since the water drops on the mirror (12) are splashed or dripped by the vibrations. Thus, not only the water drops, but also the frost and ice are removed from the mirror (12).

FIG. 4(c) shows a pulse pattern for removing water drops and frost from the mirror (12). The pulse pattern in FIG. 4(c) includes one 'LOW LEVEL' signal within duration of 400(msec), five 'HIGH LEVEL' signals each within a duration of 100(msec), two 'LOW LEVEL' signals each within a duration of 200(msec) and three 'LOW LEVEL' signals each within a duration of 100(msec).

One cycle of the pulse pattern in FIG. 4(c) is generated by the pulse pattern generating circuit (23) when a switch (SW$_2$) is turned on. This pulse pattern in FIG. 4(c) is a comprises pattern with respect to the patterns of FIG. 4(a) and FIG. 4(b). Accordingly, while the mirror (12) is vibrated, the water drops and frost can be removed from the whole of the mirror (12).

As described above, the temperature of the mirror (12) is maintained under about 60(°C) in this embodiment. Accordingly, life times of the vibrators (10a, 10b, 10c, 10d, 10e, 10f) and the mirrors are elongated.

Meanwhile, in this embodiment, the thermister (13) is utilized for detecting the temperature of the mirror (12). However, other types of detecting devices, such as a temperature switch, etc., can be utilized instead of the thermister (13).

Further, the thermister (13) is fixed to the mirror (12) in this embodiment. However, the thermister can also be positioned at a different place. For example, the thermister (13) can be fixed to the vibrators (10a, 10b, 10c, 10d, 10e, 10f).

Various modification may be made in the invention without departing from the scope or spirit of the invention.

What is claimed is:

1. A cleaning apparatus for cleaning foreign materials from a mirror comprising:
   ultrasonic vibrating means for vibrating the mirror;
   oscillating means for generating an A.C. signal and for supplying the A.C. signal to said ultrasonic vibrating means;
   switching means for selecting an A.C. signal pattern from a plurality of A.C. signal patterns, a first A.C. signal pattern being for effecting a vibrating mode, and a second A.C. signal pattern being for effecting a heating mode where the vibrating means oscillates with heat due to an energy consumption which is greater than an energy consumption of said first A.C. signal pattern; and
   controlling means for turning on and off the oscillating means based on a selected A.C. signal pattern.

2. A cleaning apparatus for cleaning foreign materials from a mirror comprising:
   ultrasonic vibrating means for vibrating the mirror;
   oscillating means for generating an A.C. signal and for supplying the A.C. signal to the ultrasonic vibrating means;
   controlling means for turning on and off the oscillating means based on a predetermined A.C. signal pattern;
   temperature detecting means for detecting a temperature of the mirror; and
   inhibiting means for inhibiting an oscillation of the mirror on the basis of the A.C. signal from said oscillating means when the temperature of the mirror exceeds a predetermined temperature.

3. A cleaning apparatus as set forth in claim 2, wherein said ultrasonic vibrating means is comprised of a plurality of piezoelectric elements arranged in a matrix in engagement with a rear surface of said mirror.

4. A cleaning apparatus as set forth in claim 2, wherein said controlling means includes a pulse pattern generating circuit having selecting means for providing different pulse patterns depending on environmental conditions.

5. A cleaning apparatus as set forth in claim 3, wherein said temperature detecting means is a thermistor disposed in contact with said mirror within said matrix.

* * * * *